Feb. 11, 1941. A. R. LYTLE ET AL 2,231,014
WELDING PROCESS AND APPARATUS
Filed Dec. 3, 1938 6 Sheets-Sheet 6
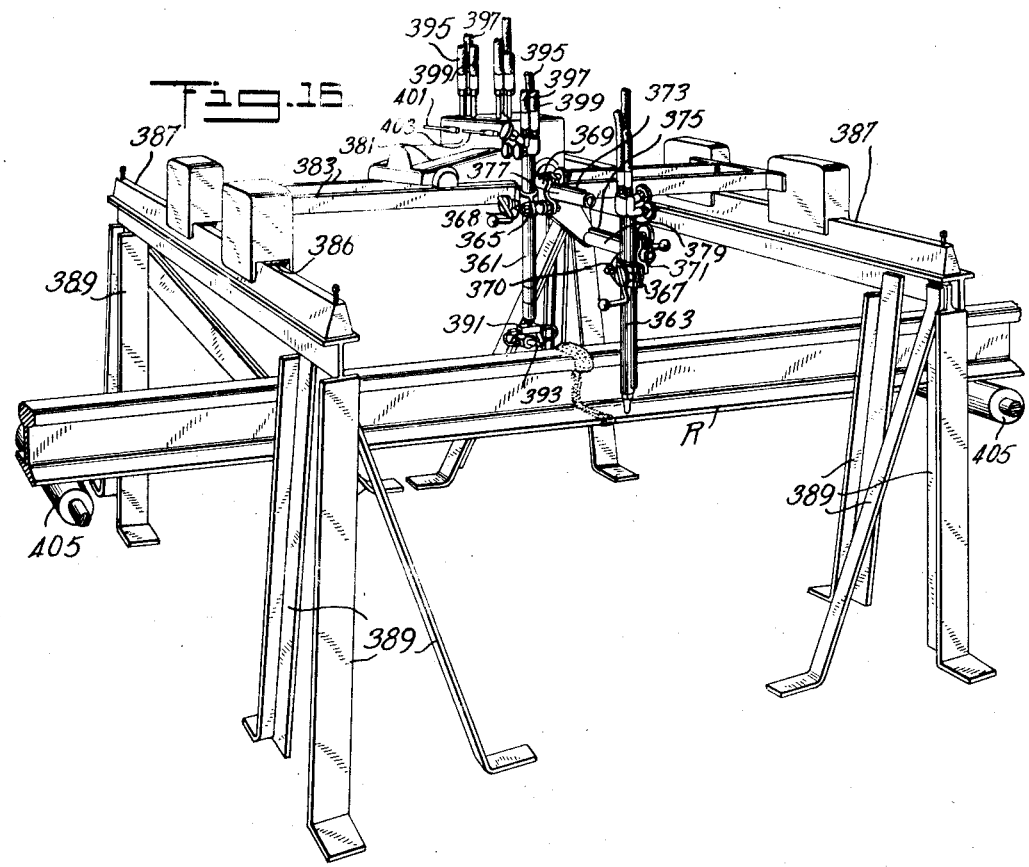
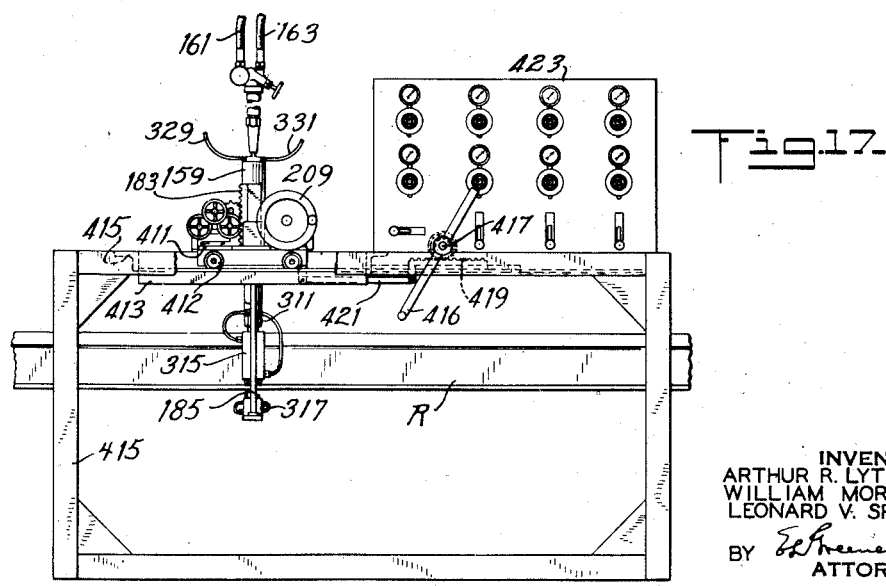
INVENTORS
ARTHUR R. LYTLE
WILLIAM MORTON
LEONARD V. SPANGBERG
BY
ATTORNEY Patented Feb. 11, 1941

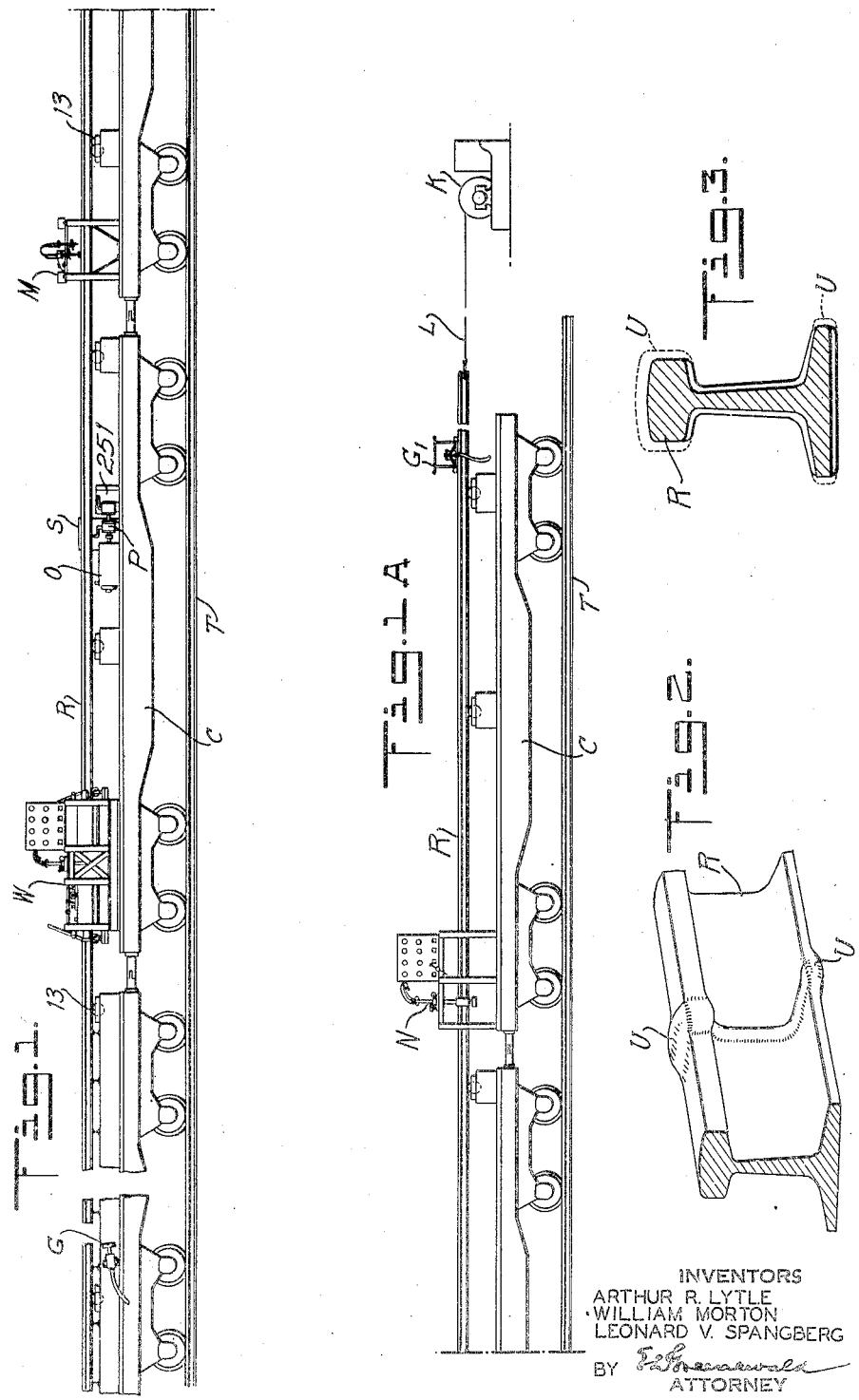

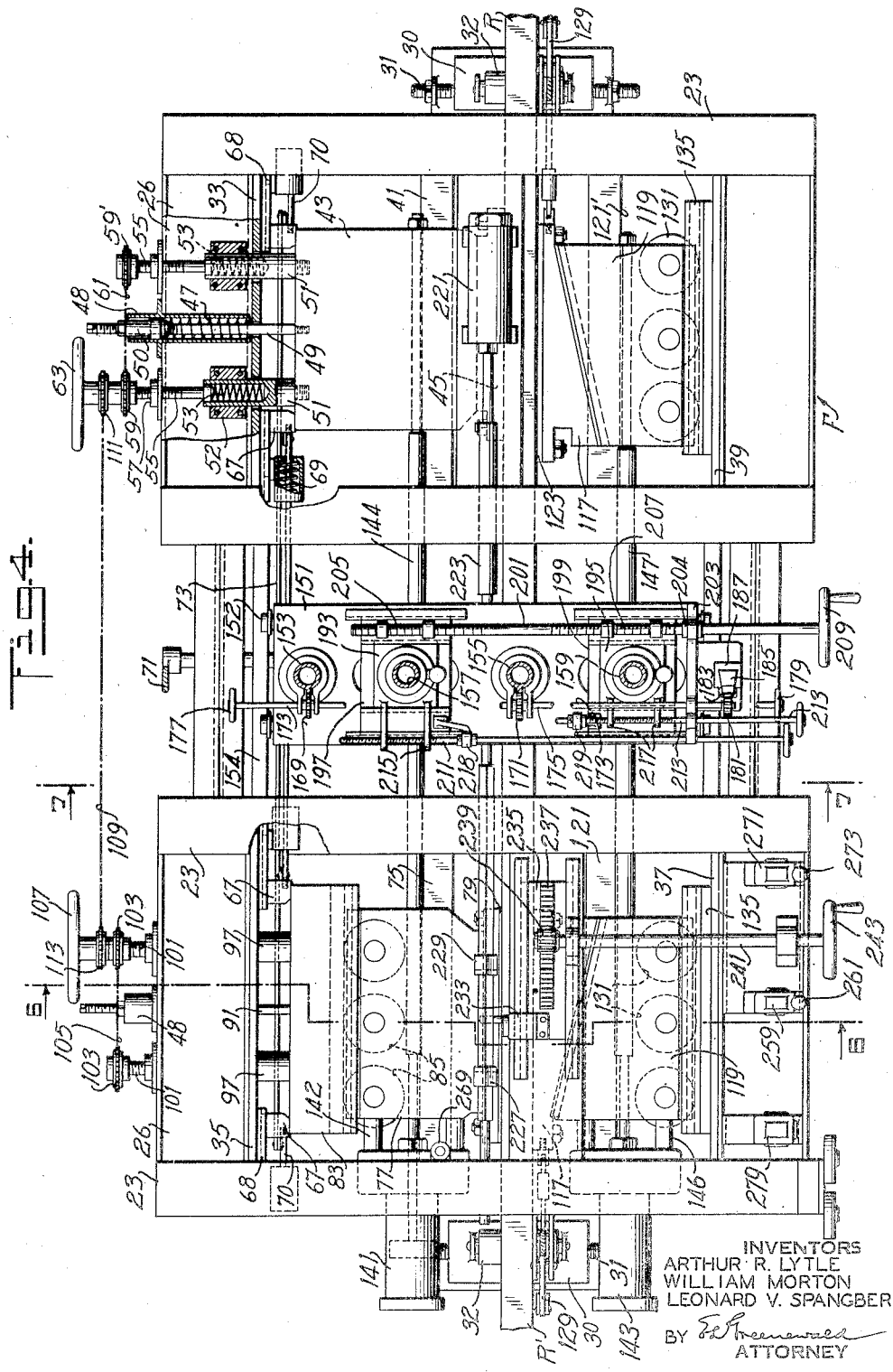

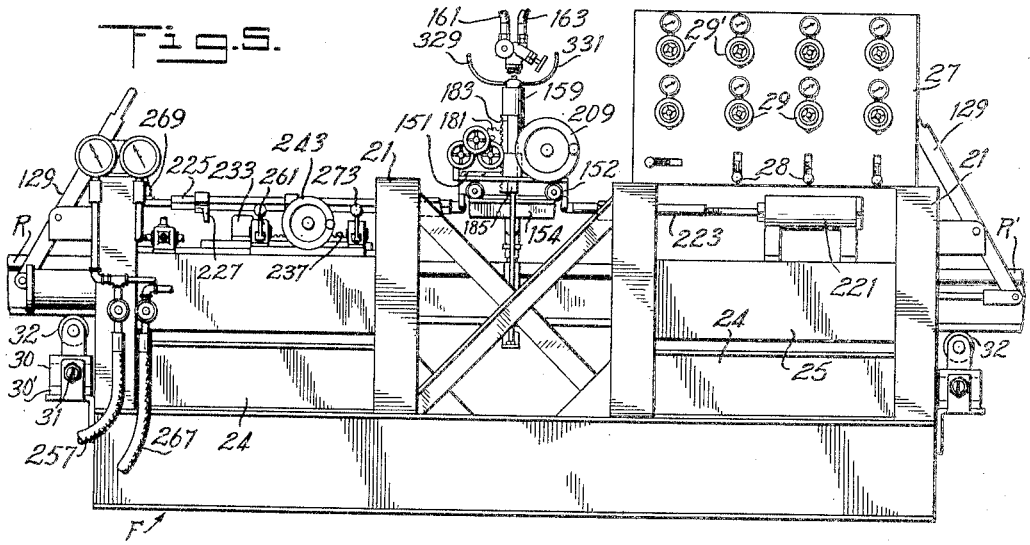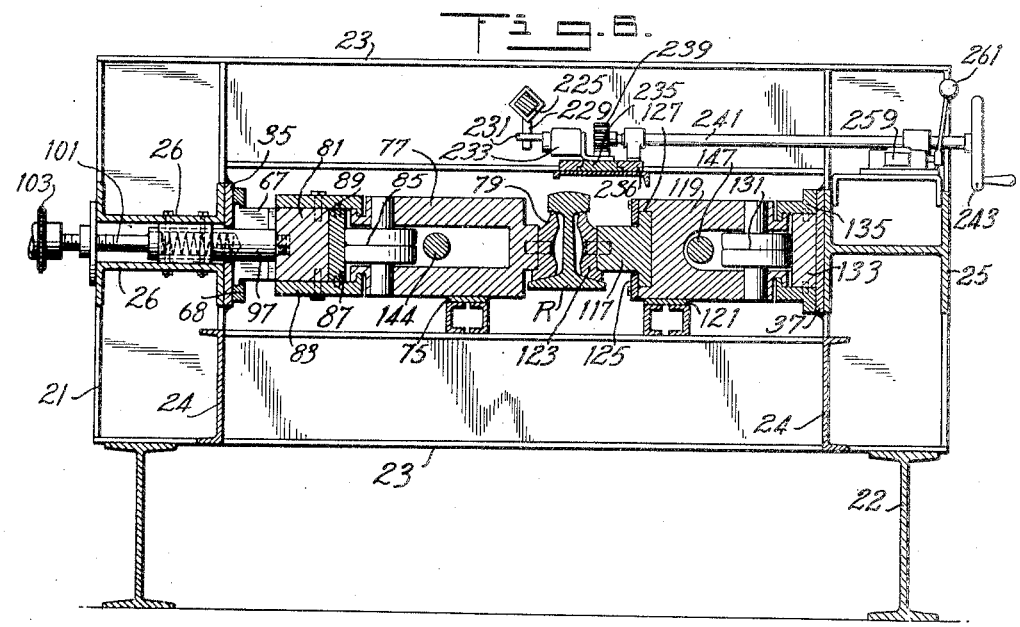

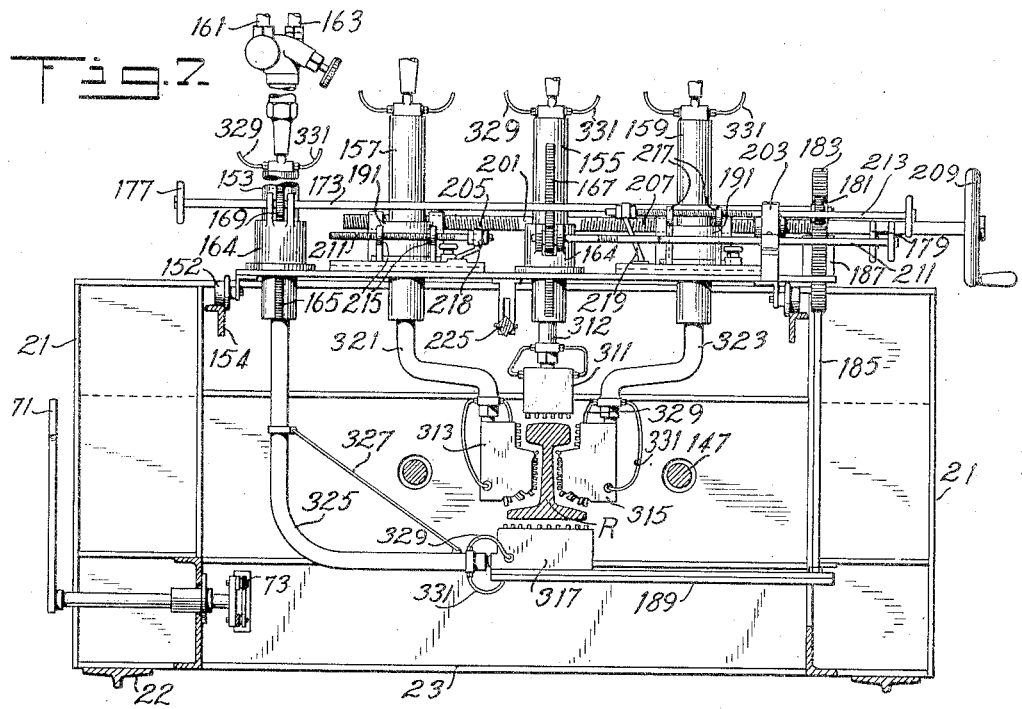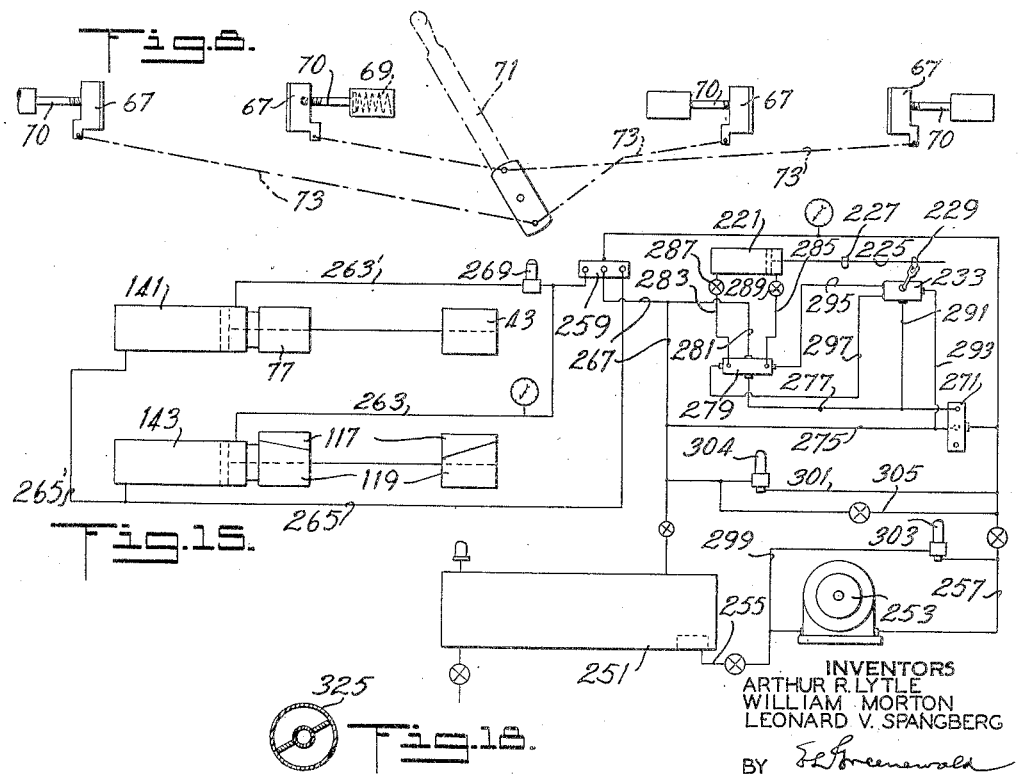

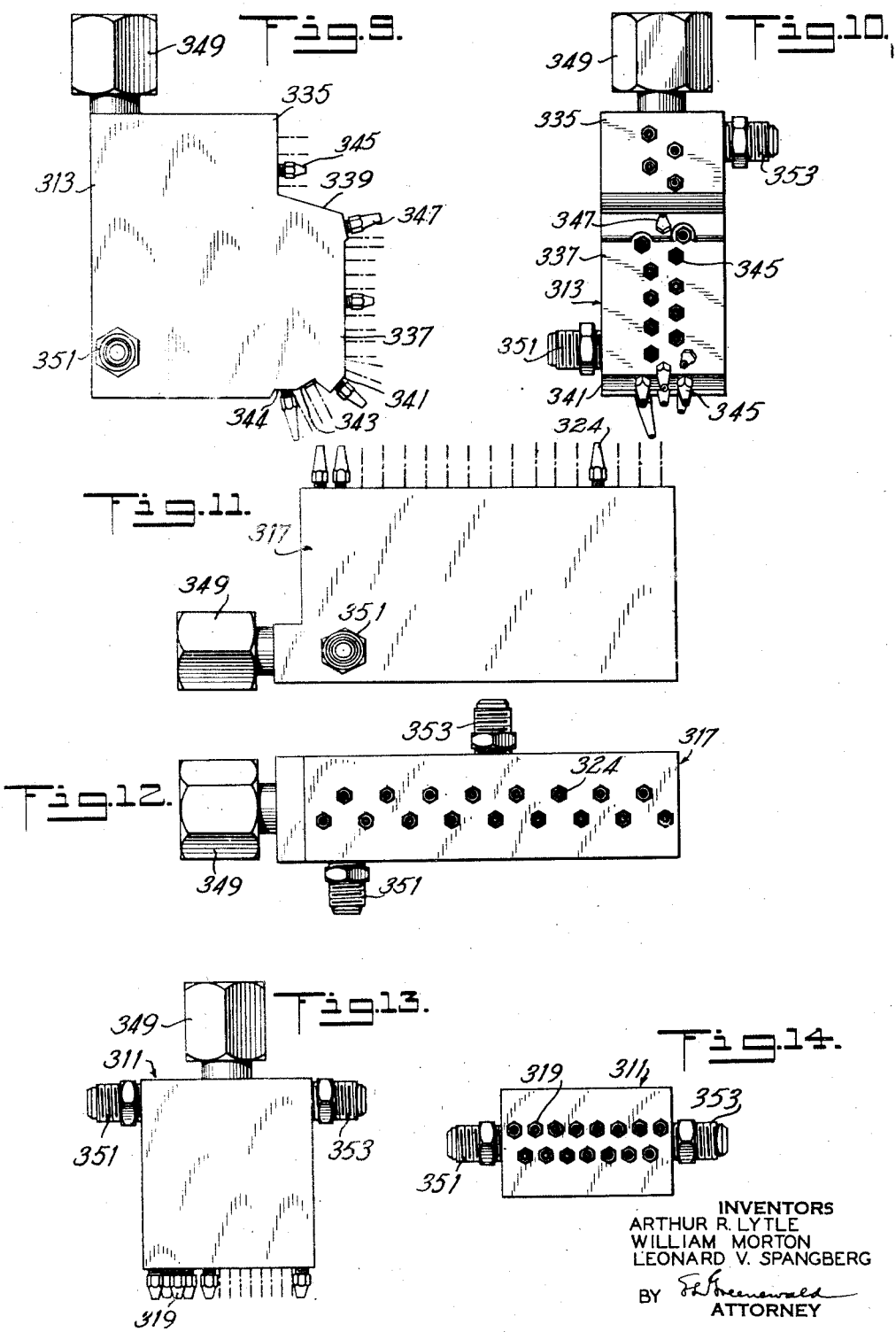

2,231,014

UNITED STATES PATENT OFFICE 2,231,014

WELDING PROCESS AND APPARATUS

Arthur R. Lytle, William Morton, and Leonard V. Spangberg, Niagara Falls, N. Y., assignors to Union Carbide and Carbon Research Laboratories, Inc., a corporation of New York Application December 3, 1938, Serial No. 243,720

33 Claims. (Cl. 29—33)

This invention relates to the art of butt-welding; and, more especially, to a method and apparatus for the production of continuous welded metal structures of great strength from weldable metal members of either uniform or non-uniform cross-section, preferably using the oxyacetylene or other gas welding process for supplying the welding heat. The invention has especial utility in connection with the pressure butt-welding of steel rails for the production of continuous rails of indeterminate length. Hence, to simplify the disclosure, the following description is directed chiefly to the last-named embodiment; though it will be understood that other embodiments are clearly within the scope of the invention, and that the latter may be used for welding objects other than rails, such as, for example, beams, pipes, rods, and the like, made of steel or other weldable material.

Processes already are known for the butt-welding of rails, and the like, while the rails are under high pressure forcing the abutting ends thereof together. Such prior processes have necessitated a manual welding operation wherein blowpipes manipulated by two or more operators were placed upon the metal at and adjacent the joint during the welding operation. The means employed for producing the pressure in the rails at the joint were such as to render extremely difficult the maintaining of the rails in exact alignment throughout the welding operation. The quality of the welded joint produced was dependent upon the skill of the individual operator; and considerable difficulty often was experienced when attempting to secure, in the heavier rails necessitated by present-day high-speed traffic conditions, welded structures having adequate strength, toughness, and resistance to impact.

Among the more important objects of the present invention are: To maintain weldable metal members being pressure butt-welded in accurate axial alignment throughout the welding operation; to provide in novel manner, in a pressure butt-welding operation, for supplying welding heat to the metal members adjacent the joint uniform for a selected distance on either side of the joint and throughout the thickness of the metal; to prevent physical separation of portions of the abutting ends of members to be welded during the early stages of the welding operation; to provide for regulating the extent of upset of rail metal at the welding zone, and for retarding the upsetting action until the metal at the joint has reached a proper welding temperature; to provide in novel manner for the rapid, effective removal of upset metal from the welded joint while it is still at high temperature; and to provide in novel manner for refining the grain structure of the welded joint, utilizing in part for the purpose, heat present therein from the welding and reshaping operations.

The process, as used for the preparation of continuous lengths of welded rail, preferably comprises the successive steps of preparing the rail ends for welding by a grinding or machining operation (a chemical treatment to remove oxide film may suffice in the case of new rails); accurately aligning the rails with their prepared ends in abutting relation; and welding the rail ends throughout their abutting surfaces, preferably by a modification of the oxygen-fuel gas welding procedure, while forcing the rail ends together under high pressure, controlling the length of the heated zone at the rail ends, the rate and distribution of welding heat flowing to this zone, and the degree and direction of pressure applied to the rail ends, such that lateral misalignment of the rails is prevented, and, at the welding temperature employed, the amount of upset metal is accurately controlled; promptly thereafter removing the upset metal from the rail joint thus produced, preferably by means of a torch-cutting or torch-deseaming operation immediately following the welding step; and thereafter annealing the welded joint by means of a heat treatment hereinafter described, applied to a zone of selected length extending on each side of the weld.

The machining or surface-grinding of the rail ends preparatory to the welding step, when employed, preferably is such that when the rails are placed end to end, the abutting faces of the rail ends will not be separated by more than 0.01 inch; and it is highly desirable that the faces be not more than 0.004 inch apart. Slight irregularities in the contour of the abutting faces due to improper grinding may be compensated for in the welding operation, as hereinafter more fully described.

Preparatory to the welding operation the rails are clamped near their ends in longitudinal alignment, with their abutting faces in intimate contact; and the rail ends are forced together under high pressure throughout the subsequent welding operation.

The welding of the abutting rail ends is effected by a plurality of groups of flames, preferably produced by a plurality of separately-controlled torches arranged around the periphery of the abutting rail ends in manner to heat all parts of the rail ends quickly to a selected welding temperature. As sources of welding heat, oxygen-fuel gas mixtures having reducing characteristics—such as oxyacetylene mixtures containing acetylene and oxygen in a ratio of more than 1 part by volume of acetylene to 1 part by volume of oxygen—are preferred, although other means providing suitable welding heat may be provided. While for welding articles of uniform cross-section the torches may be spaced more or less uniformly around the periphery of the article, it is important, when welding members of non-uniform cross-section such as rails, to employ separately regulatable torches for heating portions having different metal thicknesses, such as the rail heads, webs, and bases.

Satisfactory welding of rail steel requires a moderately narrow range of welding temperatures. However, the metal at the rail surfaces and that at the opposed faces of the rail ends must be brought to approximately the same welding temperature without surface burning or other injury to the metal directly exposed to the heating agency. This is accomplished by initially placing the torches close to the surfaces of the rails; and then, after the said surfaces have reached approximately the desired welding temperature, withdrawing the torches a short distance from the rail; or, alternatively, the intensity of the flames may be reduced, so that heat is supplied to the rail ends approximately as fast as it is conducted to the interior of the rail and the opposed faces of the rail ends.

During the welding operation each torch is reciprocated across the joint longitudinally of the rails. Both the length of the path of reciprocation and the rate of reciprocation are regulated in accordance with such factors as the composition of the rail metal, the cross-sectional thickness of the rail, the amount of upset desired at the joint, and the pressure applied during the upsetting and welding. This reciprocation of the torches prevents local overheating of the rail metal, and insures the uniform heating of the abutting rail ends to a welding temperature in a zone of selected length on each side of the joint. As the rails reach the welding temperature under the applied pressure, but below the solidus temperature of the metal, the rail metal in this heated zone becomes slightly plastic, and the pressure tends to upset the hot rail metal, forcing the rails together and causing the rail metal to bulge outwardly at the joint produced. Particularly strong, tough, high-quality welds are secured where the welding flames are reciprocated across the rail joint along paths ranging from 1 inch to 3 inches in total length, disposed equally on opposite sides of the joint.

It frequently occurs that, after the flames have been directed against the rails for a short time, there is a tendency for the bases of the rails, and sometimes the heads, to separate slightly. This may happen when, because of irregular grinding of the rail ends, the end faces do not contact at all points. It also may be due to the more rapid thermal expansion of the metal in the webs, since the latter contain less metal than, and are brought to high temperature more quickly than, the rail heads and bases. This temporary separation of the parts, though of short duration, is highly objectionable, since it may permit oxidation of the abutting rail faces before the welding temperature is reached. The presence of oxides in appreciable amounts in the welded joint would tend to reduce the strength, toughness and resistance to impact of such joint; and such oxides should be entirely eliminated from welded rails intended for carrying high-speed traffic.

Any such initial separation of the metal at the abutting rail ends is avoided by applying welding heat for a suitable period of time to the portions of the rail ends not in proper contact before the torches heating the other portions of the rail are lighted. The technique of first heating the rail bases at the joint has proved of great importance in providing a high-quality weld throughout the entire rail joint, and is particularly adapted for use in the pressure butt-welding of rails and other metal members of irregular cross-section, such as I-beams, channels, and the like.

An important feature of the invention resides in the accurate control during the welding operation of the extent and character of the upsetting of the rail metal immediately adjacent the joint being formed. The extent of this upsetting, and particularly that portion of the upsetting which occurs after the metal has reached a welding temperature, has an important bearing upon the quality of the weld produced. The quality of the welded joint has been found to be quite satisfactory where the upsetting of the rail ends, or the total shortening of the rails at the joint, is of the order of from around 0.5 inch to around 1.5 inches; and where the degree of upsetting—and the proportion thereof occurring after the rail ends have reached a welding temperature—are controlled by carefully regulating the rail areas at either side of the joint which are subjected to the welding heat, and by forcing the two rails together under a high uniform pressure during the welding operation.

A preferred procedure employed in pressure welding 112-pound rails involves the use of uniform welding pressures of from around 2000 pounds to around 3500 pounds per square inch forcing the rail ends together at the joint while uniformly heating the rails at and adjacent the joint to a temperature between 1200° and 1300° C. by encircling flames spaced sufficiently from the rails that the individual flames overlap and produce a continuous blanket or peripheral zone of flame and hot gases—the pressure being released after the two rails have been shortened at the joint by a total length of around 0.875 inch. This upsetting under high pressure produces in the present process a controllable amount of hot working or forging that contributes greatly to the strength of the joint.

As previously indicated, the amount of upsetting and shortening of the rails is influenced by the extent of the zone subjected to welding heat, as well as by the amount of pressure applied to the rails during application of welding heat. Thus, with a two-inch reciprocatory movement or stroke of the flames across the joint, a 112-pound rail may be held at a welding temperature of about 1250° C. for a length of about 1.25 inches on each side of the joint. At this temperature the metal is plastic and, under the action of suitable end pressure, gradually upsets. A four-inch stroke of the flames brings a five-inch length of rail metal to the welding temperature and causes upsetting thereof when suitable pressure is applied. The rail metal can withstand a pressure of about 1000 pounds per square inch at the above temperature for a considerable period without seriously changing shape. However, with pressures of from around 1500 pounds to around at least 3500 pounds per square inch, adequate upsetting readily occurs in the heated zone. The amount of rail shortening is less with the shorter strokes of the welding flames across the joint.

The following table illustrates the general relation between the length of travel of the flames across the joint and the amount of upsetting (indicated by rail shortening) that has been found to produce satisfactory welded rail joints:

| Total length of flame path of travel across joint | Rail shortening |
| --- | --- |
|  | Inches |
| 1.5 inches | 0.625 |
| 2 inches | 1 |
| 3 inches | 1.25 |

It sometimes may be desirable, during welding, to maintain initially a low pressure of, for example, about 1000 pounds per square inch at or between the rail ends while the metal throughout the full thickness of the sections being welded is being brought to the desired welding temperature. At this pressure practically no upsetting occurs. After the welding temperature has been reached, a higher pressure—preferably around 2000 pounds to 3500 pounds per square inch—is applied for a short interval of time; and the upsetting and welding of the rails are quickly accomplished.

Following the welding operation, the pressure on the rail is released, and the rail is moved to the reshaping station, preferably while still at a very high temperature. Here the major portion or all of the upset metal at the joint is trimmed away quickly and effectively, preferably by means of a high temperature oxy-fuel gas flame or flames directed downwardly along the sides of the heads and bases, and thereafter either across or along the top of the rail head. Under normal conditions of operation, removal of the hot upset metal requires less than two minutes; and the metal surface thus exposed is free from surface cracks and is in excellent condition for the subsequent normalizing heat treatment.

On the completion of the pressure-welding operation applied to a steel member, such as a rail—and especially in rail steel of high carbon content—the grain structure of the metal at and immediately adjacent the joint is quite coarse in comparison with that of the original base metal. In order to eliminate this coarse grain structure and restore a suitable degree of toughness and ductility to the metal, the rail metal at and adjacent the joint, for a distance from the joint preferably somewhat greater than that heated during the welding and reshaping operations, is heated to a temperature above the upper critical point for the steel being welded. In the case of the usual rail steel, this critical temperature is around 750° C. However, in the present annealing operation, the temperature preferably is raised to around 900° C., thereby not only shortening the time required for the recrystallization, but assuring that the latter is effective through the full thickness of the metal at the joint. Preferably this heat treatment is effected by means of a plurality of reciprocating flames similar to those used in the welding operation for heating the rail metal uniformly at points around the periphery of the rail at the joint. The annealing treatment produces important improvements in the physical properties of the rail metal throughout the welded joint, as illustrated by the test data appearing in the following table, each value being the average based on four tests of the sample examined:

|  | Yield point | Ultimate strength | Percent elongation in 2 inches | Percent reduction of area |
| --- | --- | --- | --- | --- |
| Rail joint as welded | 70.25 | 129.0 | 5.0 | 8.9 |
| Rail joint annealed | 57.9 | 128.6 | 10.8 | 18.5 |

In making these tests the standard A. S. T. M. tensile testing procedure was used on welded specimens 0.505 inch in diameter, taken from 112-pound R. E. railroad rails that were welded under similar conditions; and the values given above for yield point and ultimate strength are expressed in thousands of pounds per square inch.

In the accompanying drawings illustrating one preferred modification of the invention:

Figs. 1 and 1A, respectively, show somewhat diagrammatically an arrangement of apparatus for producing pressure butt-welded joints in accordance with the invention;

Fig. 2 is a perspective view of a welded joint prior to the reshaping operation;

Fig. 3 is a vertical transverse section through a rail at a welded joint, showing in dotted lines the marginal portions of upset metal later removed;

Fig. 4 is a top view of one modification of welding apparatus, parts being omitted, other parts being broken away, and still other parts being shown in section;

Fig. 5 is a front view of the welding apparatus on a smaller scale than Fig. 4, parts being omitted;

Fig. 6 is a vertical section on an enlarged scale taken along the lines 6—6 of Fig. 4, looking in the direction of the arrows, parts being omitted;

Fig. 7 is a vertical section on an enlarged scale taken along the lines 7—7 of Fig. 4, looking in the direction of the arrows, parts being omitted, and parts being broken away;

Fig. 8 is a diagrammatic view of means for shifting the latching blocks;

Figs. 9 and 10, respectively, are side and front views of a torch head for heating rail webs;

Figs. 11 and 12, respectively, are side and top views of a torch head for heating the bottoms of rail bases;

Figs. 13 and 14, respectively, are side and bottom views of a torch head for heating the top of rail heads;

Fig. 15 is a diagrammatic view of the hydraulic system for actuating the welding apparatus;

Fig. 16 is a perspective view of apparatus for reshaping the upset rail metal at a welded joint, parts being broken away;

Fig. 17 is a front view of apparatus for annealing a welded and reshaped joint, parts being broken away; and Fig. 18 is a section taken through a waterjacketed conduit leading to one of the torch heads.

Referring to the drawings, a continuous welded rail R is supported upon a series of aligned rollers 13 carried by supports on a plurality of flat cars C, movable along track T. Mounted upon the cars C in longitudinal alignment are, successively, welding apparatus W, reshaping apparatus M, and annealing apparatus N. Ahead of the welding apparatus there may be one or more rail grinders G or other means adapted to provide the rail ends with smooth clean surfaces perpendicular to the longitudinal axes of the rails.

Following the annealing apparatus are one or more standard rail grinders G₁ employed for removing excess metal from the joint and reshaping the latter. Preferably, the welding apparatus, trimming apparatus and annealing apparatus are spaced apart a distance of one rail length, so that a welding operation, a trimming operation and an annealing operation may be conducted concurrently, thus conserving time and heat energy.

Various means may be employed for moving the rail R from the welding apparatus to the trimming and annealing apparatus. The means illustrated for this purpose is a winch K, which may be power-driven if desired, and may be mounted upon a flat car or on any other suitable support. The advancing end of the rail may be connected to the winch K by a cable L or the like.

Figs. 2 and 3 illustrate a typical rail joint made by the present process, prior to removing therefrom the upset metal U which, as shown, bulges upwardly at the tops of the rail heads and bases; laterally at each side of the heads, webs and bases; and downwardly from the underside of the rail heads and bases at each side of the rails. In Fig. 3 the parts shown in solid lines represent the rail after certain portions of the upset metal U, represented by dotted lines, have been removed from the rail heads and bases.

The welding apparatus is housed within a frame F made of structural steel members preferably welded together and suitably braced. The frame may include a plurality of vertical members 21 supported on I-beams 22, and connected in pairs at their upper and lower ends by transverse members 23. The vertical members 21 at each side of the front of the frame are interconnected by members 24 and 25; and members 21 at each side of the rear of the frame are connected by members 24 and 26.

During use of the welding apparatus, the rails to be welded are brought into the frame F from the left, as shown in Fig. 4; and this may be called the entering end—and the opposite end the leaving end. An instrument board 27 is supported at one side of the apparatus upon which are mounted the oxygen and fuel gas cut-off valves 28, and pressure regulators 29, 29'. Other controls are located on the same side of the frame within ready reach of the operator. This operating side of the machine may be designated the front thereof, and the opposite side the rear.

Mounted upon the frame F at the entering and the leaving sides are vertically adjustable rail-supporting members carried on brackets on the frame. As best shown in Fig. 5, each of these members comprises cooperating wedge-shaped plates 30, 30', and a screw 31 cooperating with one of said plates to move the wedge surfaces relative to each other. Each plate 30 supports a roller 32 upon which a rail R may be supported in longitudinal alignment with another rail R'.

As best shown in Figs. 4 and 6, for accurately aligning the rails within the frame F, four steel aligning pads 33, 35, 37, 39 are secured to the frame, two at the front and rear, respectively, of the entering end; and two at the front and rear of the leaving end. The surfaces of these pads facing the rails are machined after assembly of the frame so that the two pads at the front of the frame are in perfect alignment, as are the two at the rear thereof. Referring to Fig. 4, supported at the rear of the leaving side of the frame upon a member 41 for sliding movement is an apertured metal block 43 having secured to its forward end, as by bolts, an interchangeable rail-clamping bar 45 having upper and lower wedge surfaces adapted to engage respectively the underside of a rail head and the upper surface of a rail base. The block 43 is movable toward the rear of the frame into contact with aligning pad 39 under force of an adjustable compression spring 47 mounted within a housing 48 on frame members 26 and operatively interposed between said housing and a collar 50 secured upon a rod 49 secured to block 43 in well-known manner.

For overcoming the action of spring 47 and moving block 43 toward the front of the frame, two compression springs 53 are housed within spaced tubular guide members 51, each slidable within a member 52 secured to frame members 26 and having an end secured to the rear of block 43. Each spring 53 is operatively interposed between the forward end of a member 51 and an enlarged end of an associated shaft 55 having a threaded portion cooperating with threads on a collar 57 secured to a frame member. Mounted upon the respective shafts 55 are sprocket wheels 59, 59' interconnected by a chain 61. A handwheel 63 is mounted on one shaft 55. The arrangement of parts is such that movement of the wheel 63 in one direction moves block 43 toward a rail R, after overcoming the action of spring 47.

For latching the block 43 in forward position with its clamping bar contacting a rail, there are provided latching blocks 67, 67 mounted for sliding movement along the aligning pad 33, and guided in grooves formed by members 68 associated therewith. Each block 67 is so connected by a pin 70 with an associated compression spring 69 that after the block 43 has moved toward the rail and beyond blocks 67, springs 69 move the blocks 67 into position in the rear of block 43, thus latching the latter in its forward position. As best shown in Figs. 4 and 8, for withdrawing blocks 67 from this position, a hand lever 71 is provided, which is connected through suitable links 73 with the respective latching blocks, so that movement of the lever in one direction moves the blocks 67 laterally of block 43 against the action of springs 69.

As best shown in Fig. 6, supported upon a frame member 75 at the rear of the entering side of the machine is an apertured metal block 77 having an interchangeable rail-clamping bar 79 secured to its forward end. Its opposite end is connected with a pressure-transmitting member 81 through plates 83 secured to the latter and having flanges interlocking with flanges on the rear of block 77. For moving the block 77 lengthwise of the frame and of member 81, three rollers 85 are mounted on vertical axes in the block 77 and are movable along a plate 87 secured upon member 81 by means of plates 88 and dowels 89. For moving the block 77 and member 81 toward the rear of the frame there are provided a rod 91 and associated parts similar to rod 49 and associated parts.

For moving block 77 and member 81 toward the front of the machine, and for bringing clamping bar 79 into engagement with a rail, there are provided two tubular guide members 97 and associated springs, and two shafts 101 and associated parts similar in construction and function respectively to the guide members 51, springs 53, shafts 55 and associated parts. As best shown in Fig. 4, sprockets 103 on the respective shafts 101 are interconnected by chains 105; and a handwheel 107 is mounted on one shaft 101. A chain 109 meshes with sprockets 111, 113 respectively secured upon a shaft 55 and a shaft 101. The arrangement is such that movement of handwheels 63 and 107 in one direction moves the blocks 43 and 77 at the same rate toward rails to be aligned and clamped.

As best shown in Fig. 4, for exerting lateral pressure upon the rails, and for forcing the rail ends together under high pressure, there are provided two pairs of pressure-transmitting wedge members 117, 119 at the front of the respective entering and leaving ends of the machine. The members 117, 119 are slidable laterally on supporting members 121, 121' carried upon the frame. A rail-clamping bar 123 similar to bar 45 is detachably secured to each wedge member 117 (see Fig. 6). The opposite or wedge face of each member 117 and shoulders 127 thereon cooperate with an adjacent wedge face of the corresponding member 119 and retaining plates 125 secured thereto. At best shown in Fig. 4, the respective wedge members 117, 117 taper to an apex in a direction away from each other. Levers 129 are pivotally connected with the tapered end of each member 117 through suitable linkage and permit movement of these members lengthwise of the frame.

Each member 119 is movable lengthwise of the frame upon three rollers 131 rotatably mounted on vertical axes in the member 119, and is movable along a track 133 secured between flanged supporting plates 135 carried by the frame.

As best shown in Fig. 4, for forcing the abutting rail ends together under high pressure while applying sufficient lateral pressure upon the rails to maintain them in accurate longitudinal alignment, two fluid-pressure operated cylinders 141, 143 are mounted at the entering end of the frame at the front and rear thereof on opposite sides of the rails to be joined. Cylinder 141 has its housing secured at spaced points to block 77 by means of members 142. Its piston is secured to block 43 by piston rod 144 which extends freely through an aperture in block 77.

The housing of cylinder 143 is secured to the member 119 at the entering end of the machine by members 146; and the associated piston is secured to member 119 at the leaving end of the machine by rod 147. The arrangement of parts is such that upon application of fluid pressure to the two cylinders 141, 143 forcing the pistons to the left in Fig. 4, the members 77, 117 and 119 at the entering end of the machine are free to move with rail R'; but members 117 and 119 at the leaving end are maintained immovable during upsetting of the rail metal, since interassociated block 43 is locked to the frame F.

For applying welding heat to a selected area of the rail metal at a joint being welded, there is provided, in the modification illustrated, a torch carriage 151 mounted on wheels 152 movable on track 154 carried by the frame. Mounted upon carriage 151 in spaced relation and extending through apertures in the carriage are a series of blowpipes 153, 155, 157, 159 adapted to supply welding gases to a series of welding torches disposed at the rail ends, and respectively below the rail bases, above the rail heads, and at each side of the rail webs. Each blowpipe is supplied with fuel gas and oxygen through separate valve-controlled conduits 161, 163, having therein pressure regulators 29, 29' for accurate control of the welding heat applied to each part of the rail ends.

As best shown in Fig. 7, blowpipes 153 and 155 are vertically adjustable in collars 164 mounted on the carriage, by means of racks 165, 167 cooperating with pinions 169, 171 carried on the respective shafts 173, 175 having handwheels 177, 179. The end of shaft 173 opposite handwheel 177 has a pinion 181 meshing with a rack 183 on a rod 185 slidable in a member 187 supported on the carriage. The other end of rod 185 is secured to a member 189 connected with the torch head 317.

As shown in Figs. 4 and 7, blowpipes 157, 159 are movable as a unit toward and away from each other for concurrent movement toward or from a rail web. For this purpose the respective blowpipes are mounted for vertical adjustment upon collars 191 supported upon plates 193, 195 (see Fig. 4). Each of the latter is mounted at its respective side margins for sliding movement in grooves on plates 197, 199, which in turn are supported in grooves in the torch carriage for movement lengthwise of the latter. For concurrently moving the blowpipes 157, 159 toward and from each other, a shaft 201 rotatably supported on a bracket 203 has oppositely threaded portions 205, 207 cooperating with internally threaded members on the respective plates 197, 199. Collars 204 on the shaft 201 prevent longitudinal movement thereof. The construction is such that upon turning handwheel 209 secured upon shaft 201, the respective plates 193, 195 and torches carried thereby are movable toward or away from each other.

For laterally moving blowpipes 157, 159 independently of each other, shafts 211, 213, mounted in bracket 203 for longitudinal sliding movement, have threaded portions respectively cooperating with threaded apertures in fingers 215, 217, bridging the plates 197, 199, and secured upon the blowpipe plates 193, 195. Secured upon shafts 211, 213 are members 218, 219 rigidly connecting said shafts respectively with the plates 197, 199. The arrangement provides that when either shaft 211 or 213 is rotated, the plate 193 or 195 associated therewith moves longitudinally of the carriage.

As best shown in Fig. 5, for reciprocating the torch carriage, a fluid-pressure operated cylinder 221 mounted on the frame has its piston connected by link 223 to one side of the said carriage. As shown in Figs. 4 and 6, connected with the opposite side of the torch carriage and reciprocatable in bearings carried by the frame is a metal rod 225 having two collars 227, 229 slidable thereon and provided with means for locking them in selected positions. Each collar has a finger adapted to engage and trip a valve-actuating lever 231 of a hydraulic pressure-reversing valve 233. The latter is supported upon a plate 235 that is slidable in grooves on members 236 supported on a frame member.

For moving plate 235, a rack 237 on the plate cooperates with a pinion 239 secured to a rotatable shaft 241 journalled upon the frame (see Figs. 4 and 6). The valve 233 is so arranged in the pressure line operating cylinder 221 that during movement of rod 225 in either direction, the finger on a collar 227, 229 trips the lever 231 and causes reversal of pressure in cylinder 221, thus reversing movement of the torch carriage until contact of the other collar with the lever 231 again reverses the pressure flow to cylinder 221 and the carriage movement. A handwheel 243 on shaft 241 permits movement of the plate 235 and valve carried thereby, and determines the point in the path of reciprocation of the torch carriage at which its movement is reversed.

In the form of the invention illustrated, the various rail-clamping and pressure-applying mechanisms, and the torch carriage reciprocating mechanism, are operated by fluid pressure in a hydraulic system which is shown diagrammatically in Fig. 15. Referring to that figure, 251 designates a storage tank for the pressure fluid, such as a suitable hydrocarbon oil. For maintaining a suitable pressure in the system, a pump 253 driven from a suitable source of power has its intake connected with tank 251 through valve-controlled conduit 255. A discharge conduit 257 leads from the pump to a cut-off valve 259 operated by a lever 261 (see also Figs. 4 to 6) for use in applying fluid pressure to either side of the pistons in rail-clamping cylinders 141, 143, through the respective lines 263, 263' or 265, 265'. A fluid outlet line 267 leads from valve 259 to the tank 251. A delayed-action bypass valve 269 in line 263' remains closed until a pre-set pressure of 300 pounds to 400 pounds per square inch is reached. A valve 271 having a handle 273 (see Fig. 5) has its inlet connected with conduit 257 and its outlet communicating with tank 251 through lines 275, 267. The valve 271 also has an outlet line 277 connected with a reversing valve 279. The latter has selective outlet lines 281, 283, 285 respectively communicating with conduit 267, and with the opposite ends of cylinder 221. Lines 283, 285 have therein throttle valves 287, 289 for regulating the rate of fluid flow from the cylinder 221.

The outlet of valve 271 also communicates through line 291 with the inlet to the torch carriage reversing valve 233. The outlet of valve 233 communicates with tank 251 through lines 293, 275 and 267; and with valve 279 through the respective lines 295, 297. A bypass line 299 having therein a pressure relief valve 303 connects line 255 with line 257, and a bypass line 301 having therein a pressure relief valve 304 connects the lines 257 and 267. Valve 304 is bypassed in turn by valve-controlled line 305. Cut-off valves and pressure gauges preferably are placed in the system at the points indicated in Fig. 15. The tank 251 also is provided with a breather tube, a valve-controlled drain line, and a filter screen at the inlet to line 255.

As best shown in Fig. 7 and Figs. 9 to 14, for applying welding heat uniformly to the abutting rail ends, a battery of fluid-cooled welding heads 311, 313, 315, 317 is provided. The head 311 which heats the top of the rail head is connected with blowpipe 155 through water-jacketed conduit 312. It may have two parallel rows of downwardly directed tips 319 in staggered arrangement, and is somewhat wider than the rail head. The heads 313 and 315 heat opposite sides of the rail webs and adjacent parts of the heads and bases, and are connected respectively through water-jacketed conduits 321, 323 with blowpipes 157 and 159. The sides of the heads 313, 315 facing the rails have contours conforming to the adjacent rail parts. The head 317 is disposed below the rail base, and is provided with two parallel rows of staggered tips 324. This head is connected with blowpipe 153 through a water-jacketed conduit 325 shaped to position the head horizontally below the rail, and having a brace 327.

Each of the web-heating heads 313, 315 has upper and lower vertically-disposed tip-carrying faces 335, 337 separated by a sloping shoulder 339; rearwardly and downwardly sloping tip-carrying faces 341, 343; and a bottom tip-carrying face 344. A plurality of staggered burner tips 345 are secured in two parallel vertical rows on faces 335, 337; while three of such rows of tips are disposed adjacent the faces 341, 343. The tips on faces 335 discharge flames upon the sides of a rail head and are directed normally thereto. The uppermost tip 347 on face 337 discharges flames upon the fillet between the rail heads and webs; the middle group of tips upon the latter face discharge flames upon the rail webs; and the lowermost tips on face 337 and the tips on face 341 and 343 respectively discharge flames upon the upper surfaces of the rail bases.

As shown in Fig. 7, inlet and outlet water conduits 329, 331 connect cooling jackets in each of the welding heads with cooling jackets associated with the respective gas conduits 312, 321, 323 and 325, and are connected to a source of circulating water or other cooling medium for cooling the welding heads and torch tips during use. As shown in Figs. 10 to 14, each of the welding heads has a welding gas inlet nipple 349; and inlet and outlet nipples 351, 353 for connection with the cooling fluid lines 329, 331. The shanks of the various torch tips preferably have their orifices approximately equidistant from the rail surfaces upon which they direct flames. The tips adjacent the middle of the rail base-heating head 317 and at the outer ends thereof preferably have larger orifices than the other tips to insure uniform heating of the rail parts. The tips in the rail web-heating heads are sized in general in proportion to the thickness of the metal to be heated thereby, smaller tip orifices being used for heating the webs than for heating the heavier sections.

As best shown in Fig. 16, for reshaping the welded joint, two oxyacetylene torches 361, 363 or their equivalent are supported for vertical and rotational adjustment upon clamps 365, 367 that in turn are pivotally mounted at 368, 370 upon clamping members 369, 371. The latter two members have associated therewith pinions cooperating with racks 373, 375 respectively mounted on parallel brackets 377, 379 secured upon a carriage 381 which may be motor-driven. The latter is mounted for movement at right angles to said brackets on wheels cooperating with rails 383 of a trackway which is supported at its respective ends upon wheels 386 movable along tracks 387, 387 disposed at right angles to the rails 383 and supported upon suitable members 389, 389. The arrangement of parts is such that when the torches are disposed above a rail joint to be reshaped, each torch independently may be directed at any desired angle in vertical planes respectively longitudinally of the rail, and transversely of the rail. Torch 361 has a nozzle assembly comprising a nozzle block 391 and a torch tip 393 mounted on said block for pivotal movement in a vertical plane transversely of the rail. Such a nozzle assembly is more fully described in the copending application, Serial No. 200,152 of F. C. Hasse and L. W. Young, entitled "Blowpipes," filed April 5, 1938. Each of the torches 361, 363 is provided with conduits 395, 397 for the heating fuel gas and oxygen, and with conduits 399 for cutting oxygen. Cut-off valves 401, 403 control the flow of gases to the torches. The rail R being reshaped is supported on rollers 405 carried by supports (not shown).

A metal baffle member may be employed, if desired, to prevent molten metal from contacting the top of the rail bases during the reshaping of the rail heads at the joint. Likewise a guide member may be secured to torch 361 and have an end adapted to ride upon the rail head at a point spaced from the welding zone, for maintaining the torch tip at a fixed distance from the rail.

As best shown in Fig. 17, for annealing the welded and reshaped rail joint, a torch carriage 411 and associated torch assembly are mounted on wheels 412 for reciprocation upon a trackway 413 carried by a supporting framework 415. For manually reciprocating the carriage there may be provided a handle 416 secured to a shaft 417 mounted in bearings on the framework. A pinion on shaft 417 cooperates with a rack member 418 carried on the framework for movement of the rack laterally of the shaft. The rack member and the carriage 411 are interconnected by means of a tie-bar 421.

The annealing torch carriage, and the torch and torch head assembly and associated parts mounted upon the carriage, are in general similar to the welding torch carriage 151 and its associated torch and torch head assembly. If desired, hydraulic or equivalent means may be employed for reciprocating the carriage 411, similar in construction and operation to the parts reciprocating torch carriage 151. Mounted upon the framework 415 is an instrument board 423 carrying quick-action cut-off valves and pressure regulators—similar to the instrument board 27 and associated parts.

For circulating cooling fluid through the torch heads in the welding apparatus and annealing apparatus, a circulating system is provided (see Fig. 1) which may include a storage vessel S, a circulating pump P, suitable means for operating the pump, such as an electric motor or an internal combustion engine O, and conduits (not shown) for conducting cooling fluid to the torch heads and returning the same through a suitable radiator to storage.

The preferred operation of this form of apparatus will now be described. Assuming the rear rail-clamping bars 45, 79, and blocks 43, 77 and 81 to be in retracted position, providing adequate clearance of the rails and bars, and assuming that two rails have been placed in the frame and are supported upon the rollers 32, 32, in correct longitudinal alignment, with their prepared ends in intimate contact near the longitudinal center line of the machine, the handwheel 107 (see Fig. 4) is rotated, and through the chain and sprocket system the four shafts 55 and 101 acting through the associated parts force blocks 43 and 81 toward the rails until the rears of these blocks have passed beyond the latching blocks 67, whereupon the springs associated with the latter automatically force them outwardly in the rear of blocks 43 and 81. Wedge blocks 117, 117 carrying rail-clamping bars 123, 123 are then moved by means of levers 129, 129 into pressing contact with the rails at the front side of the frame, thereby providing initial clamping of the rails. Thereafter, wheel 107 again is rotated until through compression of springs 53, at the entering and leaving sides in the rear of the frame, the total initial clamping pressure is increased to around 1000 pounds on each pair of clamping bars. This insures against slippage of the wedges 117 later when hydraulic pressure draws the latter toward each other to provide the full clamping pressure and the high welding pressure upon the rails. Hydraulic pressure now is applied by opening valve 259, thus allowing oil flow to cylinder 143 at full line pressure set by relief valve 304; and inward movement of wedge blocks 119 begins. No oil flow to cylinder 141 occurs until the preset pressure determined by the setting of valve 269 is reached, after which the cylinder 141 is actuated. This arrangement prevents any lateral movement of the rear block 77, which has no wedge, until sufficient wedging action by members 117 has occurred to prevent slipping, and until advantage can be taken of the higher value of static friction thus insured.

After both cylinders 141, 143 are under full line pressure an equal force is exerted by the two rods 144, 147 and associated parts upon the abutting rail ends, serving to press these ends together and to maintain them securely clamped in alignment with the aligning pads on the frame F. After lighting and adjusting the water-cooled torches, reciprocation of the torch carriage is begun by opening valve 271, thus admitting pressure fluid to cylinder control valve 279. The latter then admits pressure fluid to one or the other side of the torch carriage piston past the two regulating valves 287, 289. Cylinder control valve 279 is actuated by pilot valve 233 whose operating lever is reversed by the fingers on the rod 225. The frequency or rate of the reciprocations of the torch carriage is regulated by valves 287, 289, which throttle the oil leaving cylinder 221 while offering no resistance to ingoing oil, thereby maintaining the cylinder under positive pressure at all times, and insuring smooth, uniform motion of the carriage with quick change of direction.

When lighting the torches, the torch that is disposed below the rail base and adapted to heat the rail base and project flames upwardly along the webs preferably is lighted one or two minutes or more before the others, in order to prevent initial separation of parts of the abutting rail ends. After the metal at the outer surface of the rail ends has been brought approximately to the welding temperature, the torches heating the rail heads, bases and webs preferably are withdrawn somewhat further from the rails so that individual flame jets merge and form an approximately continuous envelope of hot flame and gases around the periphery of the rails, or, alternatively, the intensity of the flames may be reduced, thus completely eliminating the line- and hot-spot effect resulting from local excessive concentrations of heat. The gaseous envelope minimizes or inhibits oxidation at the rail interfaces in cases where, because of imperfect grinding or for other reasons, the abutting ends are in imperfect contact.

As the rail metal adjacent the interface reaches a uniform welding temperature throughout, a slight softening and upsetting of the metal occurs at the heated zone. The extent of upsetting varies with the rail size, length of torch carriage stroke, frequency of reciprocation thereof, and other factors. Extremely satisfactory results are secured when welding 112-pound rails when the amount of the upsetting or shortening of the rails is within the range from around 0.625 inch to around 1.25 inches. As the rails become shortened, the clamped portion of the leaving rail remains in its original position, since block 43 is not provided with rollers. The entering rail moves toward the leaving rail under action of the hydraulic cylinders 141, 143, thus providing a constant pressure upon the rail ends throughout the upsetting and rail-shortening; and continuously maintaining the rails in accurate alignment. Since half the upsetting occurs in each rail, the center line of the weld moves toward the leaving end of the frame F during the upsetting. In order to distribute the welding heat uniformly to both rails during and after this upsetting, and in order to center the heating torches over the rail joint and maintain them in this position at all times, the wheel 243 is rotated as necessary to shift the center of reciprocation of the torch carriage to the then transverse center of the rail joint. The length of the path of reciprocation of the carriage may be adjusted by shifting the stop members on rod 225 to the desired positions and locking them in place.

After completion of the weld, valve 271 is closed, and gas flow to the blowpipes is cut off. After an initial cooling period of two or three minutes to insure suitable stiffness of the weld, valve 259 is reversed, whereupon wedge blocks 119, 119 move away from each other, and block 77 moves toward the entering end of the machine to the limit of piston travel in cylinder 141. The initial lateral clamping pressure upon the rails then is released by rotating handwheel 107 which relieves the pressure exerted by springs 53. Blocks 43, 77 and 81 thereupon are pressed against the latching blocks 67, 67 by springs 47. Hand lever 71 then is actuated and withdraws blocks 67 from the rear of blocks 43 and 81, whereupon springs 69 move blocks 67 into contact with the frame, and springs 47 move blocks 43, 81 into contact with the aligning pads 33, 35, withdrawing the rail-clamping bars 45, 79 from the rails. The levers 129 then are moved to slide wedges 117 laterally to withdraw the rail-clamping bars 123 from the rail. The rail is then moved in suitable manner, first to the trimming and reshaping station, and thence to the annealing station. At the reshaping station, torch 363 is lighted and is directed downwardly, first along the edge of the base on one side of the rail, then downwardly along one side of the rail head, then along the second side of the head, and finally along the edge of the base on the second side,—in each instance moving the torch flame parallel to the axis of the rail. The cutting nozzle 393 then is directed laterally across the rail at the joint, and the carriage 381 is moved parallel to the rail whereby all or a major portion of the upset metal is removed from the top of the rail head quickly and without substantial injury to the rail metal, facilitated by the high temperature of the rail joint and adjoining rail metal at the beginning of this operation. If desired, nozzle 393 may be directed downward longitudinally of the rail head at a small acute angle with the upper surface of the rail head, and the upset metal removed by moving the nozzle transversely of the rail. Blowpipe 363 then is directed at a suitable angle for removing any remaining excess metal at the top corners of the rail head. At the starting of the reshaping operation the rail metal preferably is at a low red heat from the welding operation. If, for any reason, sufficient welding heat is not present at the beginning of this operation, the rail joint preferably is heated by a welding blowpipe prior to the cutting operation. Where the rail steel contains preheat before the flame-cutting and reshaping operation, and is subsequently reheated in the manner of the herein-disclosed annealing operation after the reshaping operation, the rail steel is not damaged; and it is possible to secure welded joints having strengths and other properties equivalent to the unwelded rail metal, thus providing welded rails extremely well suited for service under heavy traffic conditions.

The reshaped or trimmed rail next is moved to the annealing station where it is heat-treated in the manner previously described, at temperatures preferably around 900° C., while reciprocating the heating flames across the welded joint over a path of selected length somewhat greater than twice that employed in the welding operation. Important economies in heat and in labor requirements for rail handling and operation of the apparatus are effected by this series of steps conducted at high temperatures in immediate succession—the reshaping and annealing steps utilizing effectively residual heat left in the welded joint from the previous operation.

After the joints have been annealed and have cooled somewhat, the reshaped portions of the top and sides of the rail head and the margins of the base may be ground flush with the remainder of the rail in well-known manner.

It is preferred to employ in the process rails which have not been drilled near their ends for the attachment of joint bars. Where drilled rails are employed in the present process, it is preferred to plug the apertures in the rail webs before beginning the welding operation.

The use of the present invention results in important economies in time, labor and materials not heretofore possible. These economies result in part from the correlation of the welding, trimming, and annealing operations, which are performed concurrently upon rail joints spaced apart by one rail length. Each movement of a finished rail joint from a welding station to a trimming station simultaneously delivers a trimmed joint to an annealing station. The advance of the welded rail is intermittent; but uniform selected intervals of time exist between successive movements of the rail joint from station to station. Little loss of time or labor is involved, as compared with processes employed prior to the present invention. In instances where the trimming step is performed by a thermo-chemical medium, an additional advantage resides in the conservation of time and heat, still further lowering the cost of a completed joint.

To illustrate, in one commercial application of the invention for the pressure butt-welding of 112-pound rails—utilizing in the welding operation a welding temperature of around 1250° C., and reciprocating the torches along a path three inches in length at a rate of approximately 40 cycles per minute, while forcing the rails together under a pressure of around 2500 pounds per square inch—the average time in minutes required for each stage of operation is given below:

Butt-welding each rail joint_____ 11
Annealing each rail joint_____ 5

The trimming operation, utilizing oxyacetylene flames, required less time than the annealing operation.

It will be understood that other forms of apparatus differing in structural details from that specifically described may be employed in carrying out the process features of the invention; and that modifications of both the process and apparatus other than those specifically described, and falling within the scope of the appended claims, may be employed.

We claim:

1. Process of butt-welding members of weldable metal having ends of the same cross-sectional size, which comprises aligning said members and arranging the adjoining ends thereof in abutting relation; applying high temperature heating flames simultaneously to all portions of said members adjacent such abutting ends to heat said portions to a welding temperature below the solidus temperature of the said weldable metal; and, during the application of said flames, continuously applying pressure to said members perpendicularly to said abutting ends, and of sufficient intensity to force outwardly, at all points along the joint between said ends, metal which has been softened by said flames.

2. Process of butt-welding members of weldable metal as claimed in claim 1, in which said flames are reciprocated a short distance lengthwise of said members and substantially the same distance beyond each side of said joint during the application of said pressure to uniformly heat both of said ends as the position of said joint changes when the softened metal is forced outwardly.

3. Process for butt-welding members of weldable metal having ends of the same cross-sectional size, which comprises longitudinally aligning two of said members having prepared ends with said ends in abutting relation, forcing the said ends together under pressure while directing upon the abutting ends a plurality of welding flames encircling the members, and reciprocating said flames longitudinally of the members across the abutting ends along a path of fixed length.

4. Process for butt-welding steel members having ends of the same cross-sectional size, which comprises longitudinally aligning two of said members with said ends in abutting relation, forcing said ends together under high pressure while directing upon the abutting ends a plurality of welding flames encircling said members, and reciprocating said flames longitudinally of said members across the abutting ends along a path of fixed length extending between around 0.5 inch and around 2 inches on each side of the interface between said abutting ends, thereby heating the abutting ends of said members to a welding temperature, while regulating the extent of shortening of said members resulting from the resultant upset of the heated steel.

5. Process for butt-welding steel members having ends of the same shape and size, which comprises longitudinally aligning two of said members with an end of each in abutting relation, forcing the said ends together under pressure while directing upon the abutting ends a plurality of welding flames encircling said members, reciprocating said flames longitudinally of said members across the abutting ends along a path of fixed length extending for substantially an equal distance on each side of the interface between said abutting ends, and shifting the path of reciprocation of the welding flames to compensate for shift in the location of said interface as the heated steel upsets under said pressure.

6. Process for butt-welding rails, which comprises longitudinally aligning two rails having prepared ends with said ends in abutting relation, forcing the rail ends together under pressure while impinging upon the abutting rail ends a plurality of welding flames produced closely adjacent the rail surfaces, and, after the heated rail surface reaches approximately a welding temperature, withdrawing the flames a substantial distance from said rails while continuing to direct flames toward said heated rail surface, thereby surrounding the rail with a blanket of hot gases whereby the interior rail metal soaks up heat and reaches a welding temperature while preventing substantial burning of the surface metal, and continuously reciprocating said welding flames longitudinally of the rails across the abutting ends during application of said flames.

7. Process for butt-welding rails, which comprises longitudinally aligning two rails having smooth ends with said ends in abutting relation, forcing the rail ends together under a pressure not substantially higher than 1000 pounds per square inch while directing thereon a plurality of welding flames encircling the rails in the same general vertical plane transversely of the latter, and, after the rail ends approximate a welding temperature, quickly increasing the pressure forcing the rail ends together for a short time interval, thereby producing a selected degree of upsetting of the rail metal and effecting welding of the rails after the rail ends have reached the welding temperature, while preventing substantial upsetting of the metal prior thereto.

8. Process for butt-welding rails, which comprises forcing together under high pressure the abutting ends of two longitudinally aligned rails while applying a plurality of heating flames to the rail bases adjacent the abutting ends for a period sufficient to cause substantial expansion of the rail metal of said bases, thereafter applying welding heat uniformly around the periphery of the rails while maintaining said pressure, and continuously, throughout said application of heat, reciprocating the heating flames longitudinally of the rails across the rail ends along a path of fixed length.

9. Process for butt-welding rails, which comprises applying welding heat to the abutting ground ends of two longitudinally aligned rails around the entire periphery of the rails, while forcing said rails together under high pressure, and compensating for irregularities in the rail ends preventing smooth contact of said ends over their entire interfaces by initially directing the welding heat solely on those portions of the abutting ends which are out of contact with each other, thereby causing expansion of the heated metal and establishing contact of these portions of the rail ends, and thereafter applying welding heat uniformly around the entire periphery of said rails at their junction.

10. Process for butt-welding rails, which comprises directing welding flames upon the abutting prepared ends of two longitudinally aligned rails around the entire periphery of the rails, while forcing said rails together under high pressure, and compensating for irregularities in the rail ends preventing smooth contact of said ends over their entire interfaces by initially directing the welding flames on those portions of the abutting ends which are out of contact with each other, thereby causing expansion of the heated metal and establishing contact of these portions of the rail ends, thereafter applying the welding flames uniformly around the entire periphery of said rails at their junction, and continuously, during said application of welding flames, reciprocating the latter longitudinally of the rails across the rail ends in a path of fixed length and at a uniform preselected rate.

11. Process for the production of a butt-welded rail joint, which comprises forcing together under high pressure the prepared ends of abutting rails, while directing upon the abutting ends a plurality of welding flames encircling the rails and reciprocating said flames longitudinally of the rails across the interface between abutting rail ends along a path of fixed length, thereby heating the abutting rail ends to a welding temperature, upsetting rail metal, and shortening the rails, and shifting the path of reciprocation of the welding flames to compensate for shift in the location of said interface due to upsetting of rail metal.

12. Process for butt-welding rails, which comprises longitudinally aligning two rails having prepared ends with said ends in abutting relation, forcing the rail ends together under high pressure while directing upon the abutting rail ends a plurality of welding flames encircling the rails, reciprocating said flames longitudinally of the rails across the abutting rail ends along a path of fixed length, thereby upsetting rail metal at the abutting rail ends, and discontinuing application of the flames when the rails have been shortened a total of from 0.5 to 1.5 inches by said upsetting.

13. Process of progressively and continuously producing a multi-sectional length from steel members, such as rails and pipe sections, of equal length and having ends of the same cross-sectional size, such process comprising initially butt-welding two of such members together by arranging adjoining ends thereof in aligned abutting relation at a welding station and applying high temperature heating flames simultaneously to all portions of said members adjacent such abutting ends while sufficient pressure is applied longitudinally of said members to force outwardly metal softened by said flames, thereby forming a welded joint; next, advancing the so-welded members longitudinally of their length for a distance equal to the length of one of said members to position the newly-welded joint at a joint-trimming station and there removing at least some of such outwardly-forced metal while similarly aligning and butt-welding a third steel member to an end of one of the two members already butt-welded to form a second welded joint; then similarly advancing the so-welded members a distance equal to the length of one of said members to position the welded and trimmed joint at a joint-annealing station and there applying high temperature heating flames simultaneously to all portions of the members adjacent the joint while metal is being removed from the said second welded joint at the trimming station and a fourth steel member is similarly aligned and butt-welded to an end of said third member to form a third welded joint; and repeating such butt-welding, trimming, and annealing operations in succession until the desired continuous multi-sectional length is produced while correlating the time intervals of such operations to assure a periodic and uniform step-by-step advance of the sections.

14. Process of progressively and continuously producing a multi-sectional length of similar steel members, as claimed in claim 13, in which a thermo-chemical medium is employed to trim each newly-welded joint while the latter still retains heat applied thereto during the welding operation, and in which the annealing operation is performed while the joint still retains heat applied thereto during the welding and trimming operations.

15. Process for the production of a butt-welded joint, which comprises forcing together under high pressure the prepared ends of abutting steel members having ends of the same shape and size, while directing upon the members adjacent the interface between the abutting ends a plurality of welding flames encircling said members, reciprocating said flames longitudinally of said members across the interface between said abutting ends, thereby upsetting the steel adjacent said abutting ends and welding the members uniformly at said interface while maintaining said high pressure, thereafter releasing said pressure, and, while the steel at the welded area is still at a high temperature, stripping upset steel from the members at the joint thus formed by means of a flame-stripping operation, and then annealing the resultant welded and reshaped joint by means of a plurality of reheating flames surrounding the joint and reciprocated as a unit longitudinally of said members and across the joint.

16. Process for butt-welding rails, which comprises longitudinally aligning two rails having prepared ends with said ends in abutting relation, forcing the rail ends together under high pressure while directing upon the abutting rail ends a plurality of welding flames encircling the rails, reciprocating said flames longitudinally of the rails across the abutting rail ends along a path of fixed length, thereby heating the rail ends to a welding temperature and upsetting rail metal at the joint, thereafter, while the mass of rail metal is at high temperature, flame-cutting upset metal from the top and at least one side of the rail head at the joint, and annealing the reshaped rail metal at a temperature above the critical temperature for said metal.

17. Process for the production of a butt-welded rail joint, which comprises forcing the abutting surfaces of two rail ends into contact under high pressure while heating the abutting rail ends to a welding temperature by a plurality of independently-regulatable welding flames respectively directed upon the rail heads, webs, and bases at the rail ends, and while uniformly reciprocating said flames as a unit longitudinally of the rail ends along a path of selected length, thereby bringing the rail ends to a welding temperature and upsetting the rail metal and shortening the rails while maintaining the said pressure, thereafter stripping upset rail metal from the welded joint thus produced by means of a flame-cutting operation, and annealing the welded and reshaped joint by heating the joint by means of a plurality of flames surrounding the joint and reciprocated as a unit longitudinally of the rail along a path at least as long as the first-mentioned path.

18. Apparatus for butt-welding steel members having ends of the same shape and size, such apparatus comprising, in combination, mechanism for aligning said members and for continuously maintaining the opposed ends thereof in abutting relation during the welding operation; blowpipe means for applying high temperature flames simultaneously to both of said members at all portions thereof adjacent such abutting ends; means for applying pressure perpendicularly to the plane of said abutting ends and through said mechanism and at least one of said members, to force outwardly metal softened by the heat of said flames; and means for reciprocating said blowpipe means a short distance transversely of said plane while such pressure-applying means continuously applies pressure in a direction perpendicular to said plane.

19. Apparatus for butt-welding rails, comprising the combination of a carriage adapted to be reciprocated longitudinally of the rails to be joined, across the abutting ends thereof; means for reciprocating said carriage; means mounted on said carriage for supplying welding heat, the last-named means comprising independently-adjustable blowpipes, and welding heads respectively associated with said blowpipes and adapted to direct flames respectively upon the rail heads, rail bases, and upon each side of the rail webs.

20. Apparatus for butt-welding rails, comprising the combination of a carriage adapted to be reciprocated longitudinally of the rails to be joined; means mounted on said carriage for supplying welding heat, the last-named means comprising a plurality of independently-adjustable blowpipes, and welding heads respectively associated with said blowpipes and adapted to be reciprocated across the abutting ends of the rails and to direct flames respectively upon the rail heads, rail bases, and upon each side of the rail webs; means for reciprocating said carriage; and means for regulating the amplitude of the path of reciprocation of said carriage.

21. Apparatus for butt-welding metal members, comprising the combination of a carriage adapted to be reciprocated longitudinally of the members to be joined; means mounted on said carriage for supplying welding heat, the last-named means comprising a plurality of independently-adjustable blowpipes, and welding heads respectively associated with said blowpipes and adapted to be reciprocated as a unit across the abutting ends of said members and to direct flames upon the margins of said members at and adjacent the abutting ends thereof; means for reciprocating said carriage; and means for regulating the rate of reciprocation thereof.

22. Apparatus comprising a support; a torch carriage reciprocable on said support; means for reciprocating said carriage; a plurality of torches adjustably mounted on said carriage; torch heads carrying torch tips respectively associated with each of said torches; means for shifting two of said torches relative to the carriage independently of each other; and means for concurrently moving the two last-named torches as a unit toward or away from each other.

23. Apparatus comprising a support; a torch carriage reciprocable on said support; means for reciprocating said carriage; a plurality of torches adjustably mounted on said carriage; torch heads carrying torch tips respectively associated with each of said torches; and means for shifting two of said torches relative to the carriage independently of each other, the two last-named torches having stepped vertical surfaces facing each other and having at least one row of torch tips arranged thereon in vertical alignment and adapted to discharge gases in parallel streams, the two last-named torches also having laterally sloping surfaces, and torch tips mounted on said sloping surfaces within the same general vertical plane as the other tips but directed to discharge gases in divergent streams.

24. Apparatus for butt-welding rails, which comprises means for clamping two aligned rails with an end of each in abutting relation, each of said means including a member movable transversely of said rails, and wedge members movable longitudinally of said rails; means for forcing the abutting ends together under high pressure while maintaining longitudinal alignment of the rails; means for applying welding heat to the abutting ends of said rails, the last-named means comprising a plurality of torches; means for independently regulating the flow of fuel gas and oxygen to each of the respective torches; means for moving each of the respective torches independently of the others; and means for reciprocating the plurality of welding torches as a unit across the abutting rail ends longitudinally of the rails at a uniform selected rate.

25. Apparatus for butt-welding rails, which comprises means for clamping two aligned rails with an end of each in abutting relation, each of said means including a member movable transversely of said rails, and wedge members movable longitudinally of said rails; means for forcing the abutting rail ends together under high pressure while maintaining longitudinal alignment of the rails; means for applying welding heat to the abutting ends of said rails, the last-named means comprising a plurality of separately-regulatable torches; means for reciprocating the plurality of torches as a unit across the abutting rail ends longitudinally of the rails; means for regulating the length of the path of reciprocation of said torches; and means for shifting the center of the path of reciprocation in the direction of said reciprocation to compensate for rail shortening caused by upsetting of rail metal.

26. Apparatus for producing a butt-welded rail joint, which comprises means for forcing together the abutting ends of two aligned rails under high pressure; means for applying a plurality of welding flames to the abutting rail ends; means, including a plurality of independently-regulatable torches, for separately controlling the application of welding flames to the respective rail heads, webs, and bases at the abutting ends; means for reciprocating the plurality of torches as a unit longitudinally of the rails at the said ends along a path of uniform selected length; means for stripping upset rail metal from the joint and for reshaping the rails at the joint while maintaining the same at high temperature, said means including at least one flame-cutting or deseaming torch; and means for annealing the hot rail metal at the joint, said annealing means comprising a plurality of torches encircling the rail at the joint and reciprocatable as a unit longitudinally of the rail along a path of selected length.

27. Apparatus for butt-welding rails, comprising the combination of a frame; a carriage carried by said frame and adapted to be reciprocated longitudinally of the rails to be joined; means mounted on said carriage for supplying welding heat, the last-named means comprising independently-adjustable blowpipes, and welding heads respectively associated with said blowpipes and adapted to direct flames respectively upon the rail heads, rail bases, and upon each side of the rail webs; means for reciprocating said carriage along a path of selected length; and means for forcing the abutting rail ends together under high pressure, said last-named means comprising wedge members, means for transmitting rail-clamping pressure to the rails through said wedge members, each of said pressure-transmitting means including a second wedge member cooperating with one of the first-named wedge members and mounted for movement longitudinally of the frame and of the rails, and means for actuating each of said second wedge members.

28. Butt-welding apparatus comprising a frame; means carried by said frame for supporting a pair of elongated metal members longitudinally of the frame with their ends in abutting relation; aligning members carried by the frame; retractible members respectively movable laterally of the frame between one of the respective elongated members and an associated aligning member, one of said retractible members being movable longitudinally of the frame; adjustable resilient means for moving the respective retractible members laterally of the frame; clamping means associated with said retractible members; means for releasably locking each of said retractible members in position with its associated clamping means contacting one of said metal members; and means for forcing the abutting ends of the metal members into pressing engagement, the last-named means comprising two pairs of wedge members supported by said frame and movable longitudinally of the latter, clamping means associated with one wedge member of each pair, fluid-pressure means associated with the other wedge member of each pair for exerting opposing pressures upon the respective pairs of wedge members and upon the respective metal members, and delayed action fluid-pressure means for exerting opposing pressures upon the respective retractible members.

29. Apparatus for butt-welding metal members, which comprises a frame; means carried by said frame for supporting two elongated metal members in longitudinal alignment, with an end of each in abutting relation, said means comprising blocks; clamping members operatively associated with said blocks and adapted respectively to engage one side of each metal member; means for moving said blocks and clamping members laterally of the frame; wedge members; clamping members operatively connected with said wedge members; means for moving said wedge members laterally of said frame; pressure-transmitting members operatively associated with the wedge members, said pressure-transmitting members being mounted for movement longitudinally of the frame; pressure means for exerting opposing pressures upon the respective pressure-transmitting members; means for moving one of said blocks longitudinally of the frame; means for rendering the last-named means inoperative until actuation of said pressure means has been initiated; and means for applying welding heat to the abutting ends of the metal members, said heat-applying means comprising a plurality of torches, and means for reciprocating the torches as a unit across the abutting ends of the metal members.

30. Apparatus for butt-welding rails, comprising a plurality of blowpipes; welding heads carrying tips respectively associated with said blowpipes, two of said welding heads having stepped tip-carrying surfaces respectively facing each other and having at least one row of torch tips arranged thereon and adapted to discharge gases in parallel streams upon the sides of abutting rail heads and rail webs at a rail joint, the two last-named welding heads also having sloping surfaces facing each other, and torch tips mounted on said sloping surfaces and directed to discharge gases in divergent streams upon the under parts of abutting rail heads, and upon the tops of abutting rail bases at a rail joint.

31. Process for butt-welding members of weldable metal, which comprises longitudinally aligning two of said members with a surface of each in abutting relation; forcing said abutting surfaces together under high pressure while applying welding heat to such abutting surfaces around the entire periphery of said members, from a welding source substantially encircling said members at and adjacent said abutting surfaces, to raise such surfaces to a welding temperature; reciprocating such source of welding heat longitudinally of said members across the interface between said abutting surfaces, thereby upsetting the metal adjacent said surfaces and welding the members uniformly at said interface while maintaining said high pressure; and thereafter, while the metal at the welded area is still at a high temperature, flame-cutting upset metal from the members at the joint thus formed.

32. Process for butt-welding rails, which comprises longitudinally aligning two rails having prepared ends with said ends in abutting relation; forcing the rail ends together under high pressure; while the rails are thus pressed together, directing upon the abutting rail ends welding heat from a source thereof substantially encircling the rails; reciprocating said source of welding heat longitudinally of the rails across the abutting ends along a path of fixed length, thereby heating the rail ends to a welding temperature and upsetting rail metal at the joint thus produced; and thereafter, while the mass of rail metal is at high temperature, flame-cutting upset metal from the top and at least one side of the rail head at the joint.

33. Process for butt-welding members of weldable metal, which comprises placing surfaces of said members in abutting relation and surface-to-surface contact; pressing said members together with said surfaces in such abutting and contacting relation, while heating the metal at and adjacent said contacting surfaces to a welding temperature, thereby welding said members at the interface formed by such contacting surfaces and forcing upset metal outwardly at the periphery of said interface; and thereafter, while such upset metal still retains heat from the welding step, flame-cutting upset metal from the welded members.

ARTHUR R. LYTLE.
WILLIAM MORTON.
LEONARD V. SPANGBERG.